US006694873B1

(12) United States Patent
LaBelle et al.

(10) Patent No.: US 6,694,873 B1
(45) Date of Patent: Feb. 24, 2004

(54) MICROEMBOSSER FOR FASTER PRODUCTION OF HOLOGRAPHIC LABELS

(75) Inventors: Scott R. LaBelle, Bloomington, MN (US); Bill L. Bohn, Eden Prairie, MN (US)

(73) Assignee: Holographic Label Converting, Inc., Eden Prairie, MN (US)

( * ) Notice: Subject to any disclaimer, the term of this patent is extended or adjusted under 35 U.S.C. 154(b) by 67 days.

(21) Appl. No.: 09/887,480

(22) Filed: Jun. 22, 2001

Related U.S. Application Data

(63) Continuation of application No. 09/747,375, filed on Dec. 21, 2000, now abandoned, which is a continuation of application No. 09/336,030, filed on Jun. 18, 1999, now abandoned.

(51) Int. Cl.$^7$ .................................................. B31F 1/07
(52) U.S. Cl. ............................ 101/23; 101/28; 101/32
(58) Field of Search ........................... 101/23, 22, 28, 101/31, 32; 156/582, 209; 430/1

(56) References Cited

U.S. PATENT DOCUMENTS

| 482,267 A | * | 9/1892 | Netwon ........................ 101/23 |
| 899,624 A | * | 9/1908 | Sayre ........................... 101/377 |
| 3,229,620 A | * | 1/1966 | Rogers et al. ................ 100/308 |

(List continued on next page.)

FOREIGN PATENT DOCUMENTS

| DE | 2258329 | 6/1974 | ............ D06C/23/04 |
| DE | 3206718 | 9/1983 | ............. B29D/7/22 |
| GB | 0808900 | 2/1959 | ........................ 38/4 |
| JP | 01-130933 | 5/1989 | ............ B29C/59/04 |
| JP | 04107503 A | * 4/1992 | ............. G02B/5/18 |
| JP | 5293875 | 11/1993 | ............ B29C/47/88 |
| JP | 05293875 A | * 11/1993 | ............ B29C/47/88 |
| JP | 10-006398 | 1/1998 | ............ B29C/59/04 |

OTHER PUBLICATIONS

Machine translation of JP 05–293875 from Japanese Patent Office website.*
"ET Line Labels)", http:// ww.omet.it/ing/macc/et/et255g.html, 1 p., (1999).
"Foilsaver Makes High Speed Rotary Foil Stamping Ecomonical", http://hmt.com/holography/total/foilsaver-1.html, Foilsaver Rotary Hot Samping, 1–3 p.

(List continued on next page.)

Primary Examiner—Daniel J. Colilla
(74) Attorney, Agent, or Firm—Schwegman, Lundberg, Woessner & Kluth, P.A.

(57) ABSTRACT

Holographic labels are used on a variety of articles of manufacture for security, authenticity, or aesthetic appeal. Manufacturing a holographic label or sticker typically entails microembossing, that is, imprinting or cutting, microscopic grooves into a clear plastic sheet with a shiny aluminum coating. The grooves diffract light and form a three-dimensional image, such as the dove commonly found on Visa™ brand credit cards. Unfortunately, conventional microembossing machines, or microembossers, suffer from a number of problems. For example, these microembossers include two large base rollers that move back and forth in sequence to contact a shimroller. The clumsy back and forth movement not only limits how fast embossing can occur but also causes misalignment of embossed images. To address this and other problems, the inventors devised an exemplary microembosser which includes a single base roller and a shimroller which one or more unique features. Among these features are magnetic members that assist in holding a shim; an internal temperature sensor that aids control of shimroller temperature; and one or more shimcollars or shimclamps that spans across a gap between the leading and trailing edges of a shim. Other features of the exemplary embosser include an automatic mechanism for separating the base roller and shimroller during shutdown.

29 Claims, 11 Drawing Sheets

U.S. PATENT DOCUMENTS

| | | | | |
|---|---|---|---|---|
| 3,721,189 A | | 3/1973 | Bray .................. 101/382 MV | |
| 3,750,571 A | | 8/1973 | Germann ................. 101/415.1 | |
| 3,949,672 A | * | 4/1976 | Cadmus, Jr. ................. 101/368 | |
| 4,023,887 A | | 5/1977 | Speers ......................... 350/96 | |
| 4,066,014 A | | 1/1978 | Van Haaften ............... 101/157 | |
| 4,095,498 A | | 6/1978 | Biggar, III ................... 83/346 | |
| 4,116,594 A | | 9/1978 | Leanna et al. ................. 425/3 | |
| 4,130,042 A | | 12/1978 | Reed ............................ 83/887 | |
| 4,155,693 A | * | 5/1979 | Raley ......................... 425/363 | |
| 4,312,686 A | | 1/1982 | Smith et al. ................ 156/209 | |
| 4,641,575 A | | 2/1987 | Cavagna ...................... 101/23 | |
| 4,698,258 A | | 10/1987 | Harkins, Jr. ................ 428/285 | |
| 5,109,767 A | | 5/1992 | Nyfeler et al. ................ 101/23 | |
| 5,327,825 A | | 7/1994 | Parker et al. ................. 101/32 | |
| 5,397,290 A | | 3/1995 | Hellenthal .................. 492/46 | |
| 5,464,690 A | | 11/1995 | Boswell ...................... 428/334 | |
| 5,492,370 A | | 2/1996 | Chatwin et al. ............ 283/110 | |
| 5,495,981 A | | 3/1996 | Warther ....................... 229/71 | |
| 5,521,722 A | | 5/1996 | Colvill et al. .............. 358/500 | |
| 5,533,002 A | | 7/1996 | Abraham ................. 369/275.3 | |
| 5,585,144 A | | 12/1996 | Waitts ....................... 427/258 | |
| 5,603,259 A | | 2/1997 | Gross et al. .................. 101/33 | |
| 5,629,068 A | | 5/1997 | Miekka et al. .............. 428/148 | |
| 5,642,226 A | | 6/1997 | Rosenthal .................. 359/619 | |
| 5,643,678 A | | 7/1997 | Boswell ..................... 428/467 | |
| 5,665,194 A | | 9/1997 | Kay ........................... 156/325 | |
| 5,670,003 A | | 9/1997 | Boswell ..................... 156/220 | |
| 5,672,410 A | | 9/1997 | Miekka et al. .............. 428/148 | |
| 5,674,580 A | | 10/1997 | Boswell ..................... 428/40.9 | |
| 5,698,333 A | | 12/1997 | Benoit et al. ............... 428/516 | |
| D390,246 S | | 2/1998 | Cienfuegos-Jovellanos ................. D16/225 | |
| 5,715,316 A | | 2/1998 | Steenblik et al. ............. 380/54 | |
| 5,722,319 A | | 3/1998 | Hirano ........................ 101/23 | |
| 5,746,864 A | | 5/1998 | Reiter et al. ................ 156/220 | |
| 5,753,349 A | | 5/1998 | Boswell ..................... 428/195 | |
| 5,759,683 A | | 6/1998 | Boswell ..................... 428/334 | |
| 5,783,017 A | | 7/1998 | Boswell ..................... 156/231 | |
| 5,810,957 A | | 9/1998 | Boswell ..................... 156/220 | |
| 5,810,965 A | * | 9/1998 | Fwu .......................... 156/359 | |
| 5,858,512 A | | 1/1999 | Dit Picard et al. .......... 428/171 | |
| 5,862,750 A | | 1/1999 | Dell'Olmo ................... 101/32 | |
| 5,932,150 A | | 8/1999 | Lacey ...................... 264/1.34 | |
| 5,937,759 A | * | 8/1999 | Mitsam et al. .............. 101/378 | |
| 5,967,009 A | | 10/1999 | Truttmann et al. ............. 83/52 | |
| 6,000,106 A | * | 12/1999 | Kampfer et al. .............. 24/452 | |
| 6,026,725 A | * | 2/2000 | Okonski .................. 83/698.21 | |
| 6,059,003 A | * | 5/2000 | Wittkopf ..................... 156/555 | |
| 6,062,134 A | * | 5/2000 | Eitel et al. .................... 101/28 | |
| 6,087,940 A | | 7/2000 | Caperna et al. .......... 340/572.5 | |
| 6,103,989 A | | 8/2000 | Jennings et al. ........ 219/121.67 | |
| 2002/0000143 A1 | * | 1/2002 | Okonski ........................ 83/72 | |

OTHER PUBLICATIONS

"Inline Holography the Answer or the Question", *Holography News*, vol. 14, No. 2, 1 pages, (Mar. 2000).

"James River Products, In.—Holographic Product Machinary and Technology", http://hmt.com/holography/jrp/index.html, 1–8 p.

"Machine Specifications Holographic Embossing Machines", http://hmt.com/holography/jrp/machinespec.html, 1–4 p.

"NonaVision's In–Line Embossing Process", *Holography News*, vol. 10 No. 5, 3 pages, (Oct. 1996).

"Optimation Expanding In–Line Production to 28", *Holography News*, vol. 14, No. 2, 1 page, (Mar. 2000).

Omet, "ET Line (Labels)", http://ww.omet.it/ing/macc/et/et2558gb.html, 1 p.

Omet, "TV Line (Napkins/Place–Mats)", http://www.omet.it/ing/macc/tv/opt.html, 1 p.

"In–Line Holography: A Watershed Crossed", *Holography News*, 10 (5), (1996),pp. 1, 2.

* cited by examiner

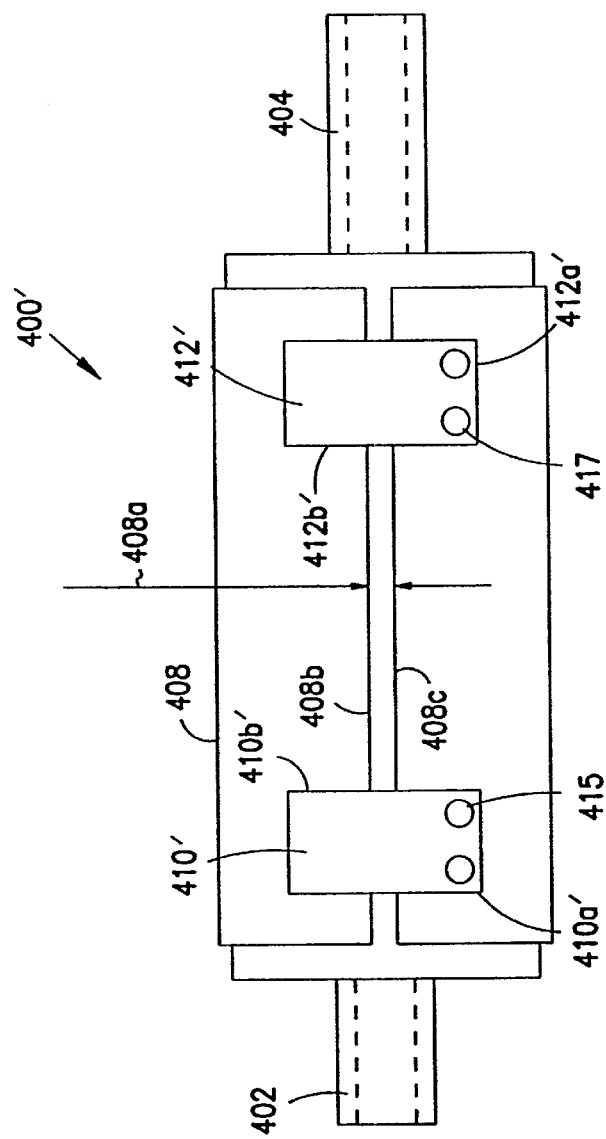
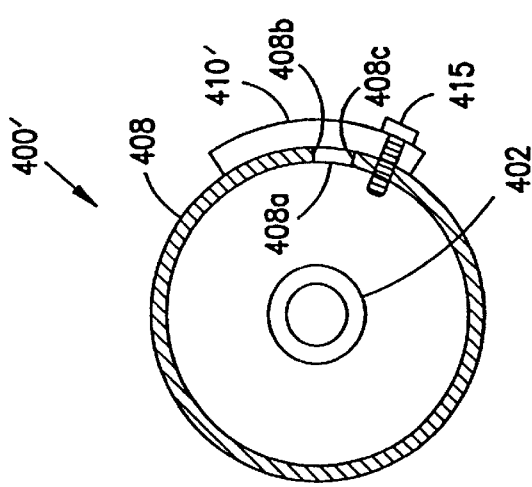
FIG. 4C
FIG. 4D

MICROEMBOSSER FOR FASTER PRODUCTION OF HOLOGRAPHIC LABELS

This application is a continuation of U.S. patent application Ser. No. 09/747,375, filed on Dec. 21, 2000 now abandoned, which is a continuation of U.S. patent application Ser. No. 09/336,030, filed on Jun. 18, 1999, now abandoned.

RELATED APPLICATION

The present application is related to a co-assigned and co-filed United States patent application entitled In-line Microembossing, Laminating, Printing, and Diecutting. This related application is incorporated herein by reference.

TECHNICAL FIELD

The present invention concerns microembossers, especially those used in the manufacture of holographic labels or stickers.

BACKGROUND OF THE INVENTION

Holographic labels are used on a variety of articles of manufacture for security, authenticity, or aesthetic appeal. For example, holographic labels are used on credit cards, driver licenses, passports, compact discs, fine jewelry certificates, concert tickets, and magazine covers.

One of the most important steps in manufacturing a holographic sticker or label is known as microembossing. Microembossing is a process of imprinting or cutting microscopic grooves into a layer of material, sometimes called a substrate. For substrates made of a transparent material with a reflective backing, for example, clear plastic with an aluminum coating, the grooves diffract light entering the substrate; the aluminum coating reflects it; and the grooves diffract the reflected light as it exits. If the grooves are arranged in a particular order and cut to appropriate depths, the light entering and exiting the clear plastic diffracts and forms a three-dimensional image, such as the dove commonly found on Visa™ brand credit cards. The microembossed substrate can then be used as part of a holographic label.

Microembossing is usually done using a rotary microembosser. The rotary microembosser typically includes three wide rollers, specifically a shimroller and left and right base rollers. The shimroller, which lies between and contacts the left and right base rollers, includes two steel bars, known as shimclamps, bolted across its width. (Inside the shimroller is a heating element controlled using a temperature sensor that measures surface temperature of the shimroller.) A rectangular stamping shim, bearing twin left and right microgroove patterns on one face, wraps around approximately one-half or two-thirds the circumference of the shimroller, with the shimclamps fastening two opposing edges of the shim against the shimroller and thus preventing either edge from moving during operation of the microembosser.

In operation, the microembosser pulls a long band of reflective plastic, known as a web, left to right through the microembosser, with the web passing first between the left base roller and the shimroller and then between the shimroller and right base roller. As the web passes between the left base roller and the shimroller, the left microgroove pattern on the stamping shim presses into it, transferring the left pattern to a portion of the web. Similarly, as the web passes between the right base roller and shimroller, the stamping shim transfers the right microgroove pattern to an adjacent portion of the web. Thus, as the web feeds through, the embosser embosses a repeating sequence of left and right patterns into the web.

This typical microembosser suffers from at least four problems. First, the two parallel shimclamps, both of which span the width of the shimroller, are cumbersome and time-consuming to install because of the number of bolts, typically 11 per shimclamp, used to secure the shim to the shimroller. Second, the dual, or left-right, base roller, configuration shortens life of the stamping shim and thus forces early shim replacement. Shimlife is shortened because the left and right base roller sequentially move back and forth to press the passing web into the metal stamping shim, flexing the metal shim with every movement.

The third problem concerns the difficulty in timing the back and forth movement of both base rollers so that the left and right patterns cut in the web are accurately and consistently aligned with each other over an entire web length. Misalignment of these two patterns makes it more difficult to align other web processing equipment, such as printers and diecutters, used to manufacture labels with the patterns on the web, ultimately increasing web waste and label-manufacturing costs. Fourth, moving the left and right base rollers back and forth in sequence limits the operating speed of the microembosser—that is, how much web the microembosser can process—to less than 50 linear feet per minute. Ultimately, this limits the production rate of holographic labels.

Accordingly, there is a need for a better microembosser.

SUMMARY OF THE INVENTION

To address this and other needs, the inventors have developed a rotary microembosser with a number of unique features. One embodiment of the rotary microembosser includes a single base roller and a shimroller with one or more of the following unique features:

one or more magnetic members that assist in holding a shim;

one or more laterally adjustable shimclamps or shimcollars that facilitate shim installation and adjustment;

an internal temperature sensor that aid control of shimroller temperature;

one or more shimcollars or shimclamps that spans across a gap between the leading and trailing edges of a shim.

One embodiment of the exemplary rotary embosser includes a unique base roller with a Torlon™ polyimide or equivalent sheath for better durability and a lift-off mechanism for automatically separating the base roller from the shimroller during shutdown.

BRIEF DESCRIPTION OF THE DRAWINGS

FIG. 4C is a top view of another alternative shimroller 400'.

FIG. 4D is a side view of shimroller 400'.

DESCRIPTION OF EXEMPLARY EMBODIMENTS

The following detailed description, which references and incorporates the above-identified figures, describes and illustrates specific embodiments of the invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Figure 1A:
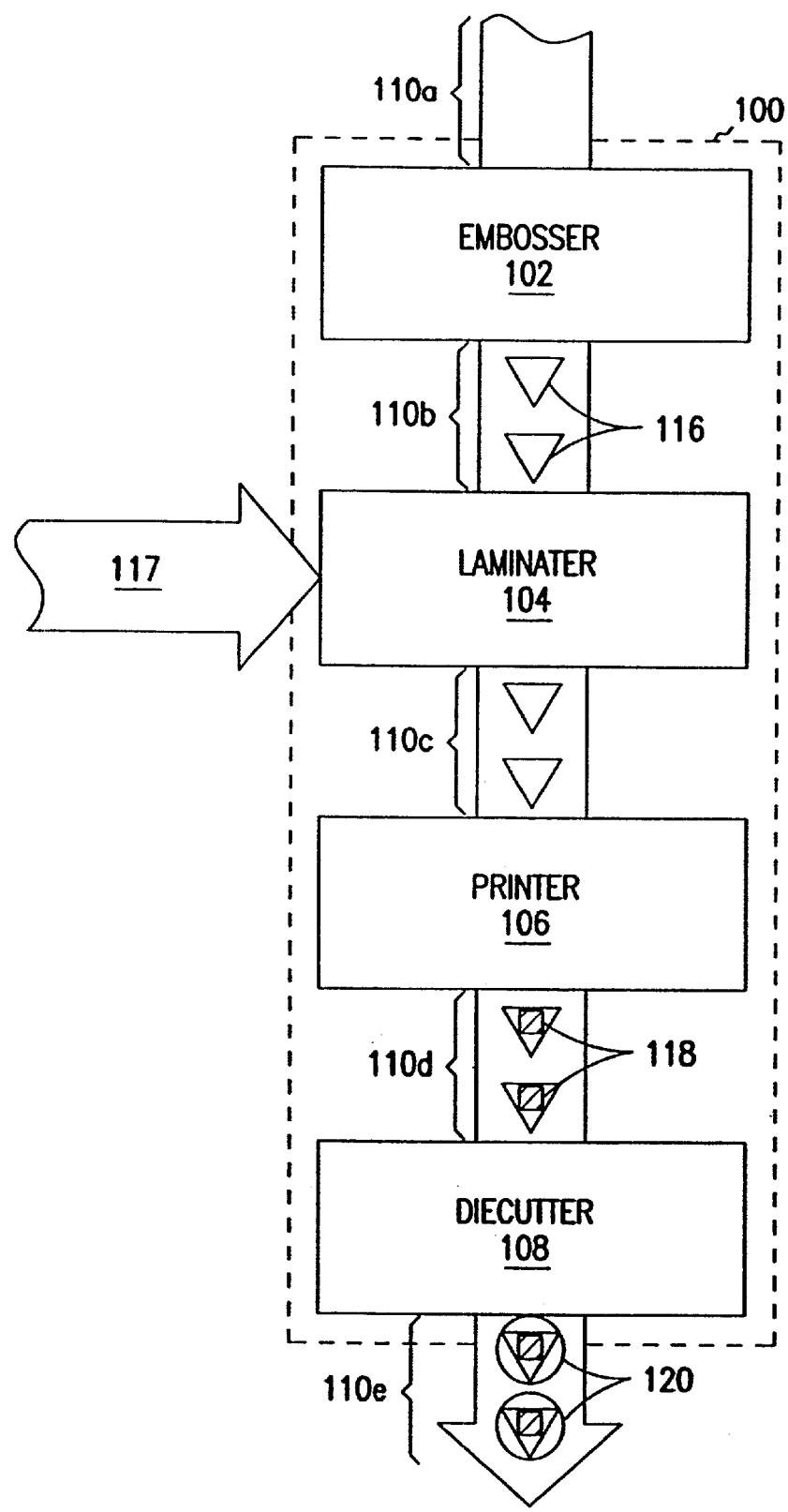
FIG. 1A is a block diagram of a unique in-line rotary web processing apparatus 100, including a rotary embosser 102, a laminater 104, a printer 106, and a die-cutter 108 operating concurrently on a continuous web of material 110.

FIG. 1A shows a block diagram of an exemplary embodiment of an in-line rotary web processing apparatus (and method) 100, embodying numerous inventive teachings. Though the apparatus and method have a wide variety of uses, it is especially useful for forming diecut, pressure-sensitive labels and stickers with reflective and/or diffractive images, and printed images, such as barcoding or serial numbers. For example, the in-line apparatus and method are also useful for forming compact disks or other mediums bearing digital or analog information and for forming lenses or portions of lenses. The apparatus and process are equally applicable to both hard and soft embossing applications, though for clarity the description focuses on a hard embossing application.

In particular, apparatus 100 includes a rotary embosser 102, a laminater 104, a printer 106, and a diecutter 108. The embosser 102, laminator 104, printer 106, and die-cutter 108 are arranged "in line," that is, to operate concurrently and sequentially on a continuous web 110 which feeds through the apparatus. (Other embodiments of the invention include additional web-processing devices, omit the laminator, printer, or diecutter, and/or reorder the laminater, printer, and diecutter. Also, other embodiments arrange two or more of the stages vertically.) In the exemplary embodiment, web 110 feed through each machine at a substantially constant rate of speed, for example, 100–200 feet (30–60 meters) per minute.

Web 110 includes five distinct sections 110a, 110b, 110c, 110d, and 110e, delineated by the embosser, laminater, printer, and diecutter. Section 110a represents the pre-embosser state of web 110; section 110b includes embossed reflective and/or diffractive images or regions 116; section 110c includes a laminated backing web 117; section 110d includes print images or regions 118 as well as embossed regions 116; and section 120 includes die-cut images or regions 120, print regions 118, and embossed regions 116. The in-line arrangement facilitates not only registration of regions 116, 118, and 120, but also higher processing speeds than conventional processes which rollup the web at the output of the microembosser, the laminater, or the printer and transfer to another web-processing device.

Figure 1B:
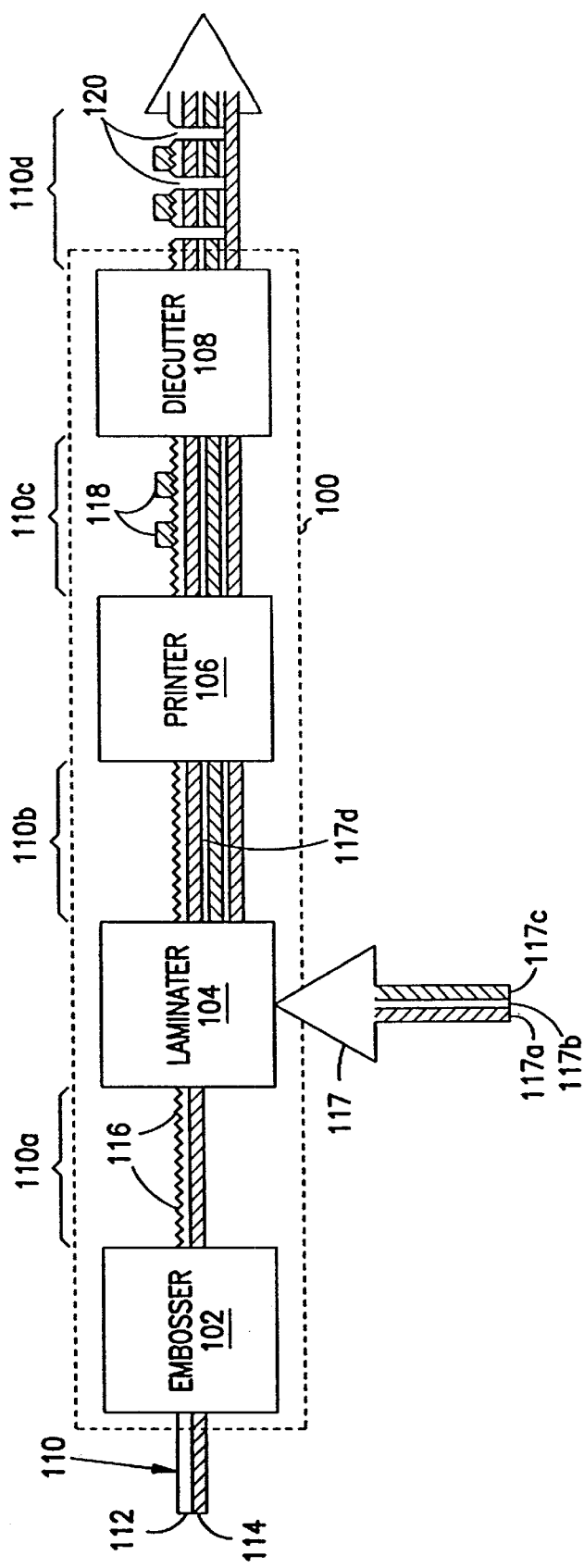
FIG. 1B is a cross-sectional view of apparatus 100, showing an exemplary structure of web 110 and web 117.

FIG. 1B shows a cross-sectional view of web 110 running through embosser 102, laminater 104, printer 106, and diecutter 108. This view shows that section 110a, the pre-embosser section of web 110, includes two layers; a transparent plastic layer 112 and a reflective layer 114. Layer 114, in the exemplary embodiment, comprise one or more metals, such as aluminum, gold, an alloy of such metals, or more generally, any reflective material affixable to layer 112. Also, this view shows embossed regions 116, print regions 118, and diecut regions 120. Other embodiments reverse the position of the plastic and metallized layers so that embossing occurs on the metalized side of the web and backing 117 is applied to layer 112.

More importantly, however, FIG. 1B shows an exemplary structure of backing web 117 and an exemplary structure representative of its lamination with web 110 in sections 110b–110e. In particular, exemplary backing web 117 includes three layers: a paper layer 117a, a pressure-sensitive-adhesive layer 117b, and a release-backing layer 117c. This type of backing is sometimes called a transfer tape. (Transfer tape can be purchased from a variety of manufacturers and vendors in numerous grades, for example, freezer grades, pharmaceutical grades, and so forth.) Release-backing layer 117c can be separated or peeled away from layer 117b, allowing pressure-sensitive-adhesive layer 117b to be applied to an article of manufacture. During lamination, paper layer 117a is glued, using a thermal-sensitive or UV-curable adhesive, represented as layer 117d, to layer 114 of web 110. In some embodiments, backing web 117 consists of only one paper layer; however, the invention is not limited to any number or combination of backing web materials.

Figure 2:
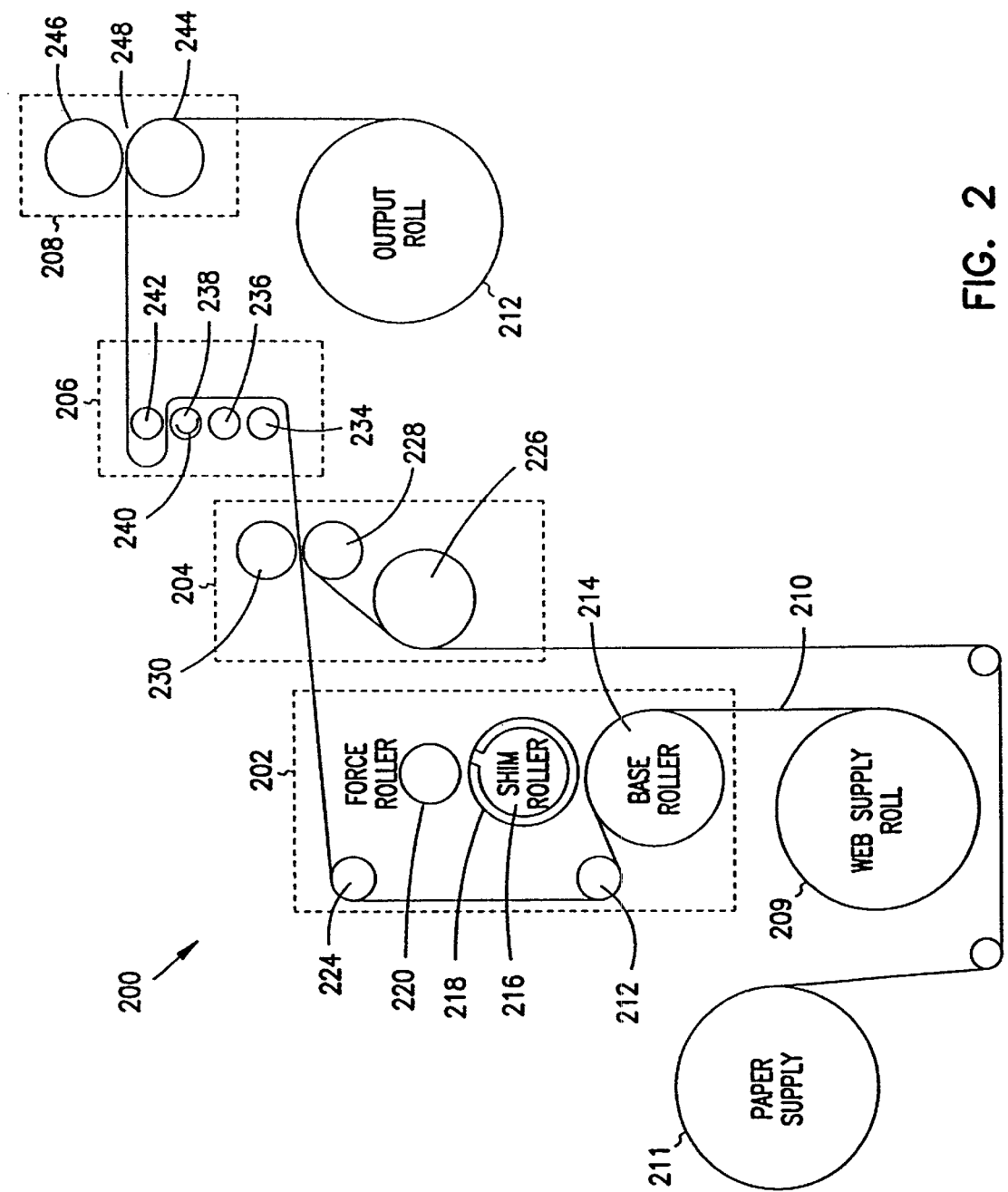
FIG. 2 is a schematic diagram of an exemplary embodiment 200 of in-line rotary web processing apparatus 100, including a rotary embosser 202, a laminater 204, a printer 206, and a die-cutter 208 operating concurrently on a continuous web of material 210.

FIG. 2 shows an exemplary in-line rotary web processing apparatus 200 embodying teachings of apparatus 100. Apparatus 200 includes an exemplary rotary microembosser 202, an exemplary laminater 204, an exemplary printer 206, and an exemplary diecutter 208 operating concurrently on a continuous web 210 which originates from a web supply roll 209 and terminates at output roll 212. In the exemplary embodiment, web 210 comprises a reflective plastic film, such as an aluminized polyester, which is approximately six-to-seven inches (150–180 mm) wide and 0.001 to 0.002 inches (0.0025–0.005 mm) thick. However, the invention is not limited to any particularly web compositions or dimensions. Indeed, other embodiments of the invention use films of polyethylenterephthalate or biaxially oriented polyproplylene, cellulose tri-acetate, polystyrene, polyethylene, and/or polyvinyl chloride.

From supply roll 209, web 210 feeds through exemplary microembosser 202. Microembosser 202 comprises a base roller 214, a shimroller 216, a shim 218, a force roller 220, and guide rollers 222 and 224. More precisely, web 210 feeds over base roller 214 to contact shim 218 held by shimroller 216. (In one embodiment, base roller 214 automatically engages with shimroller 216 during start-up of embosser 200 and disengages during shutdown.) Shim 218 includes one or more reflective and/or diffractive images or patterns, that is, images or patterns which are meant to produce a reflective or diffractive image. Shim 218 embosses or transfers these images into web 210 when pressed against web 210 with sufficient force in a direction perpendicular, or transverse, to the axis of rotation of base roller 214 and shimroller 216. Force roller 220 presses shimroller 218 into base roller 214 to facilitate image transfer from shim 216 to web 210. Maintaining shimroller 216 in a temperature range of 200 to 500° F. (93–260° C.), for example, 400° F. (204° C.), also facilitates image transfer. The temperature, however, should be adjusted generally to match the web materials and web processing rate, with faster rates generally requiring higher shimroller temperatures than slower rates.

From base roller 214, embossed web 210 passes around guide rollers 222 and 224 into laminater 204. The invention is not limited to any particular genus or species of laminater. Indeed, many commercially available printers can be used as laminaters or augmented with laminator options. When using a conventional printer without a laminator attachment, one uses an adhesive instead of ink.

Laminator 204 includes a guide roller 226 and pinch rollers 228 and 230. Web 211, which comprises a three-layer structure like that shown for web 117 in FIG. 1A, feeds over guide roller 226 between pinch rollers 228 and 230 where it meets web 210. Webs 210 and 211 are laminated together using a thermal-activated adhesive as they pass through the pinch rollers, before ultimately feeding into printer 206.

Printer 206 can be of any type, for example, a single- or multicolor flexographic or central-impression printer as known in the art. Exemplary types include in-line flexographic, in-line rotary letter press, rotating gravere, rotating screen, central-impression UV rotary letter press. In other embodiments, printer 206 comprises an inkjet- or ion-deposition-type automatic numbering and/or barcoding machine alone or in combination with another printer. In the exemplary embodiment, printer 206 includes one or more stages, for example, seven, though for clarity, only one is shown in FIG. 2. Each stage can be used to apply a different color ink or to apply the same color ink.

Specifically, printer 206 includes an ink-pickup roller 234, a gravure 236, a flex-o-roller 238, a flex-o-plate 240, and a pressure roller 242. Pickup roller 234 transfers ink of a predetermined color to gravure 236, which collects and meters out a predetermined amount of ink to plate 240 as plate 240 rotates conjointly with flex-o-roller 238. As the laminated web passes between flex-o-roller 238 and pressure roller 242, ink-bearings areas or regions of plate 240 contact web 210 (or web 211 if so desired), forming a print image on the web. Each revolution of flex-o-roller 238 forms a corresponding printed image on web 210. Thus, repeated revolutions form a printed sequence of images substantially equispaced along the length of web 210. In some embodiments, particularly those with multi-color printing, printer 206 includes one or more ink-drying or ink-curing stations that accelerate the drying or curing of inks. One example of such a station uses ultraviolet light as to accelerate drying or curing.

After printer 206, web 210 and web 211 feed into diecutter 208. Diecutter 208 can take a variety of forms. Manufacturers of suitable commercial diecutters include Webtron, Sanke, and Profiteer. (See also U.S. Pat. No. 4,095,498 which describes another suitable diecutter and which is incorporated herein by reference.) Thus, the invention is not limited to any genus or species of diecutter.

In the exemplary embodiment, diecutter 208 includes an anvil roller 244 and a die cylinder 246 which form a nib 248.

As known in the art, webs 210 and 211 feed through nib 246, contacting die cylinder 244 which cuts webs 210 and/or 211 and thus defines individual labels. Diecut webs 210 and 211 exit diecutter 208 onto roll 212. Though not shown in this exemplary embodiment, other embodiments of diecutter 208 include a waste-matrix remover or stripper for separating scrap portions of webs 210 and 211 onto a separate roll. Scrap portions are generally those portions outside the perimeters of any individual label.

Figure 3:
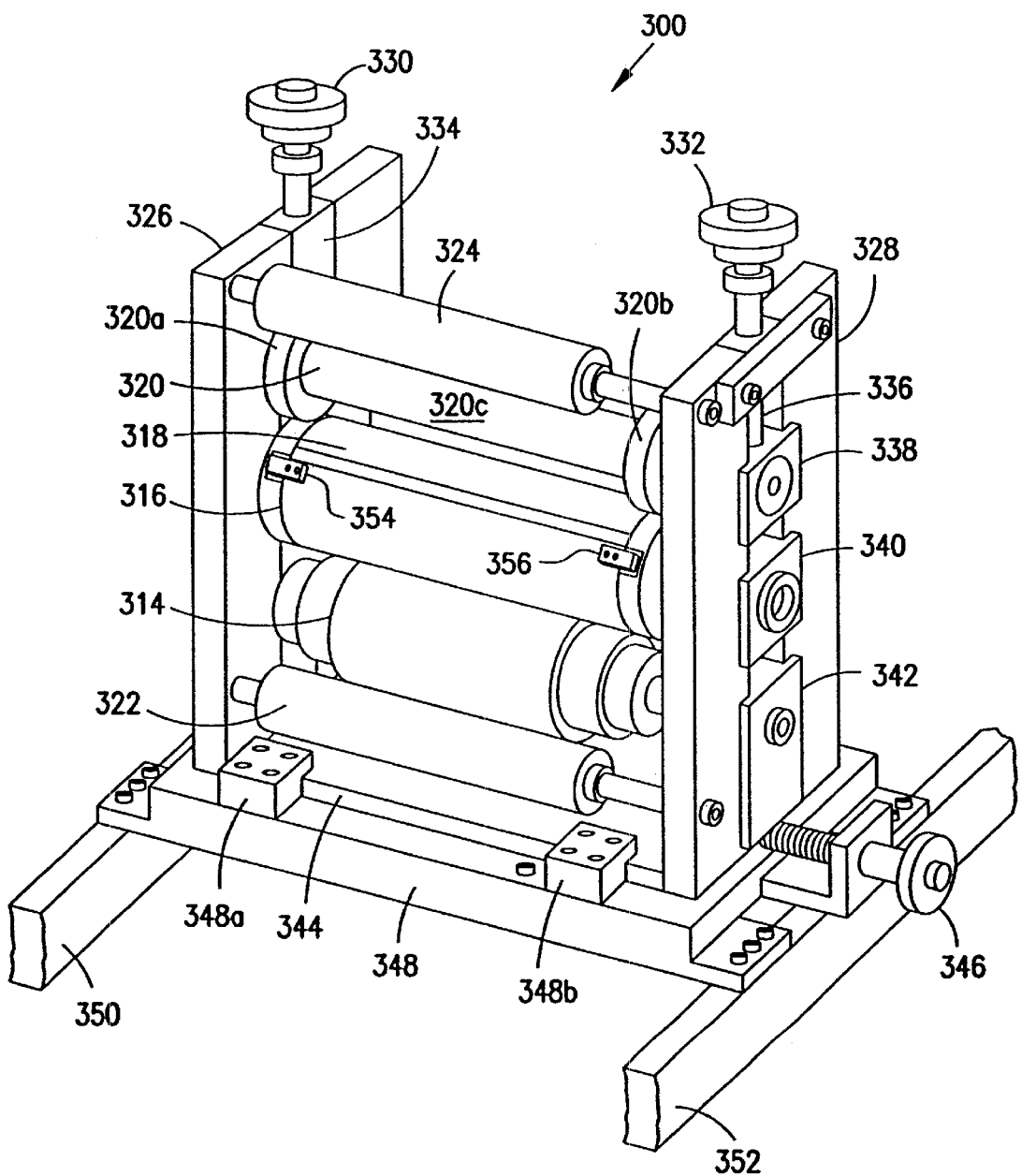
FIG. 3 is perspective view of an exemplary rotary microembosser 300 incorporating teachings of the present invention.

FIG. 3 is perspective view of an exemplary rotary microembosser 300 embodying several inventive concepts. Like microembosser 202 in FIG. 2, microembosser 300 includes a base roller 314, a shimroller 316, a shim 318, a force roller 320, and guide rollers 322 and 324. Additionally, microembosser 300 includes left and right side frame members 326 and 328, left and right force-roller adjustments 330 and 332, left and right bearing block channels 334 and 336, right force-roller bearing block 338, right shimroller bearing block 340, right base-roller bearing block 342, bottom frame plate 344, lateral adjustment mechanism 346, bottom frame support 348, and left and right frame support rails 350 and 352.

More precisely, FIG. 3 shows that base roller 314, shimroller 316, force roller (or bridge assembly) 320 and guide (or idle) rollers 322 and 324 are held in an axially parallel arrangement between left and right side frame members 326 and 328. Left and right side frame members 326 and 328 are attached respectively to opposing sides of bottom frame plate 344. Frame plate 344 has a front edge 344a which engages with front guide clips 348a and 348b of bottom frame support 348. Frame plate 344 also has a back edge (not shown) which engages with two back guide clips (also not shown.) Bottom frame support 348 is attached to left and right frame support rails 350 and 352, which, in the exemplary embodiment, are attached to or stem from a printer support frame (not shown.) Frame plate 344 can be moved laterally or transversely relative to bottom frame support 348 and support rails 350 and 352 using lateral adjustment mechanism 346. Thus, one can adjust the lateral alignment of base roller 314, shimroller 316, force roller 320 and guide rollers 322 and 324 relative to support rails 350 and 352 and other web processing equipment, such as a laminater, printer, diecutter, or even another embosser.

Base roller 314, shimroller 316, and force roller 320 are supported between left and right side frame members 326 and 328. To this end, right bearing-block channel 334 engages with right bearing blocks 338, 340, and 342, and left bearing block channel 336 engages with corresponding left bearing blocks (not shown in this view.) Each right-left pair of bearing blocks engages with a corresponding spindle portion of respective rollers 314, 316, and 320.

More particularly, force roller 320 includes two end (radial bearing) portions 320a and 320b and a center portion 320c, with the end portions having a greater diameter than that of the center portion. End portions 320a and 320b contact corresponding portions of shimroller 316. Left and right force-roller adjustments 330 and 332 screw down onto the bearing blocks for force roller 320, allowing one to adjust the force that roller 320 applies to shimroller 316 and therefore the force shim 318 exerts on base roller 314. In the exemplary embodiment, end portions 320a and 320b have a diameter of 3.0 inches (76 mm) and length (or width) of 0.75 inches (19 mm); center portion 320c has a diameter of 1.375 inches (35 mm) and a length of 16.0 inches (406 mm); and the end and center portions are made of steel. However, the invention is not limited to any particular dimensions, composition, or form of force roller 320.

Shimroller 316 includes unique shimclamps 354 and 356 which clamp one edge of shim 318, for example, its leading edge, to shimroller 316. The remainder of shim 318 wraps around shimroller 316. In the exemplary embodiment, the circumference of shimroller 316 is greater than the length of shim 316 to prevent the shim from overlapping itself. More precisely, in the exemplary embodiment, shim 318 has a length of about 11.990–11.995 inches (304–305 mm) and the circumference of shimroller 316 is about 12.0 inches (305 mm), providing a gap of about 0.005–0.010 inches (0.5–1.0 mm) between the ends of the wrapped shim. Though not necessary, the gap is desirable to facilitate thermal expansion of the shim during operation of the embosser.

Figure 3A:
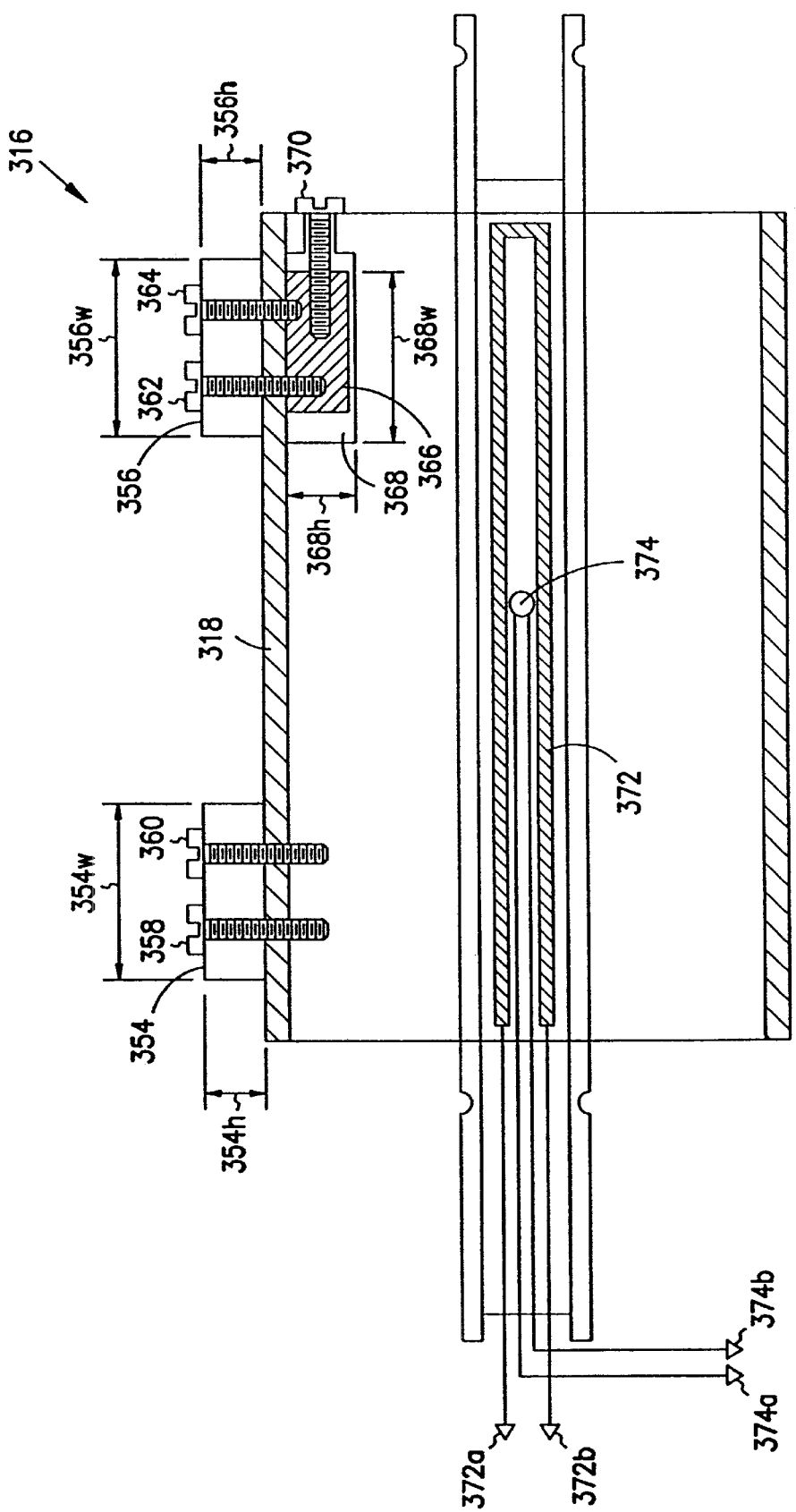
FIG. 3A is a simplified cross-sectional view of shimroller 316.

FIG. 3A, a simplified center-cross-sectional view of shimroller 316 shows details of shimclamps 354 and 356. In particular, this view shows that shimclamp 354 is fixed to the surface of shimroller 316 via fasteners 358 and 360 which, in the exemplary embodiment, are screwed into a pair of tapped holes, thereby pinching a portion of shim 318 between clamp 358 and a portion of shimroller 316. In the exemplary embodiment, shimclamp 354, which is formed of steel, has a width (or length) 354w of 0.75–1.00 inches (19–25 mm), a height 354h of 0.25 inches (6 mm), and depth of 0.75 inches (19 mm) (not shown.)

Shimclamp 356, on the other hand, is fixed via two screws 362 and 364 to a movable—more precisely, a laterally movable—block 366 that rests in a rectangular recess 368 in shimroller 316. Block 366 is fastened to roller 316 via an adjustment screw 370 that allows one to adjust the lateral (or axial) position of shimclamp 356 and block 366 relative to shimroller 316 and embosser 300. In some embodiments, a coil spring or other spring or positional-bias mechanism biases block 366 toward the near or far end of shimroller 316, that is, toward the left or right side of recess 368. Therefore, using lateral-adjustment screw 370 allows one to move shimclamp 356 laterally relative to shimclamp 354, and thus to ensure that at least the leading edge of shim 318 lays substantially flat against the cylindrical surface of shimroller 316.

In other embodiments, shimclanps 354 and 356 (and related components) mirror each other in structure and function. For example, one embodiment includes left and right shimclamps that both resemble shimclamp 354, and another embodiment includes two shimclamps that both resemble shimclamp 356. This latter embodiment thus allows one to move a left and right shimclamp using a respective adjustment screw.

FIG. 3A also shows that shimroller 316 includes an internal heating element 372 with power leads 372a and 372b. The exemplary embodiment, shimroller 316 further includes a temperature sensor 374 within (that is, interior to the outermost or exterior surface of) shimroller 316 or within the volume defined by installed shim 318. Temperature sensor 374 includes sensor-output leads 374a and 374b. The heating element and temperature sensor, both of which rotate in unison with shimroller 316, are electrically connected through a rotary electrical union (not shown) to a conventional temperature-control circuit (also not shown.) The exemplary embodiments provides the heating element and temperature sensor as a heating cartridge. One example of a commercially available heating cartridge is the 208-volt, 2500-watt, Firerod™ heating cartridge from WatLow, Inc. of St. Louis, Mo. This heating cartridge, has a diameter of about 0.75 inches (19 mm), includes an internal J-type thermocouple for sensing the temperature of the element.

In contrast to conventional shimrollers that use external temperature sensors to sense the surface temperature of the shimroller, the use of an internal temperature sensor, such as sensor 374, provides superior control of the temperature of shimroller 316. Exterior placement of the sensor leads to undesirable temperature oscillation during operation of the embosser, which in turn leads to melting or burning the shim or the web or to under or over embossing of the web and consequent web waste. Placing the temperature sensor inside the shimroller mitigates or eliminates these problems.

Figure 3C:
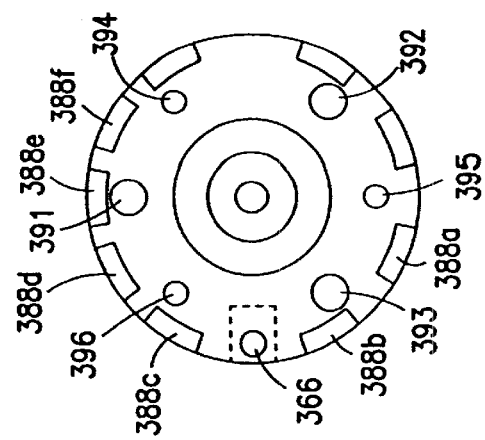
FIG. 3C is a side view of shimroller 316.
Figure 3B:
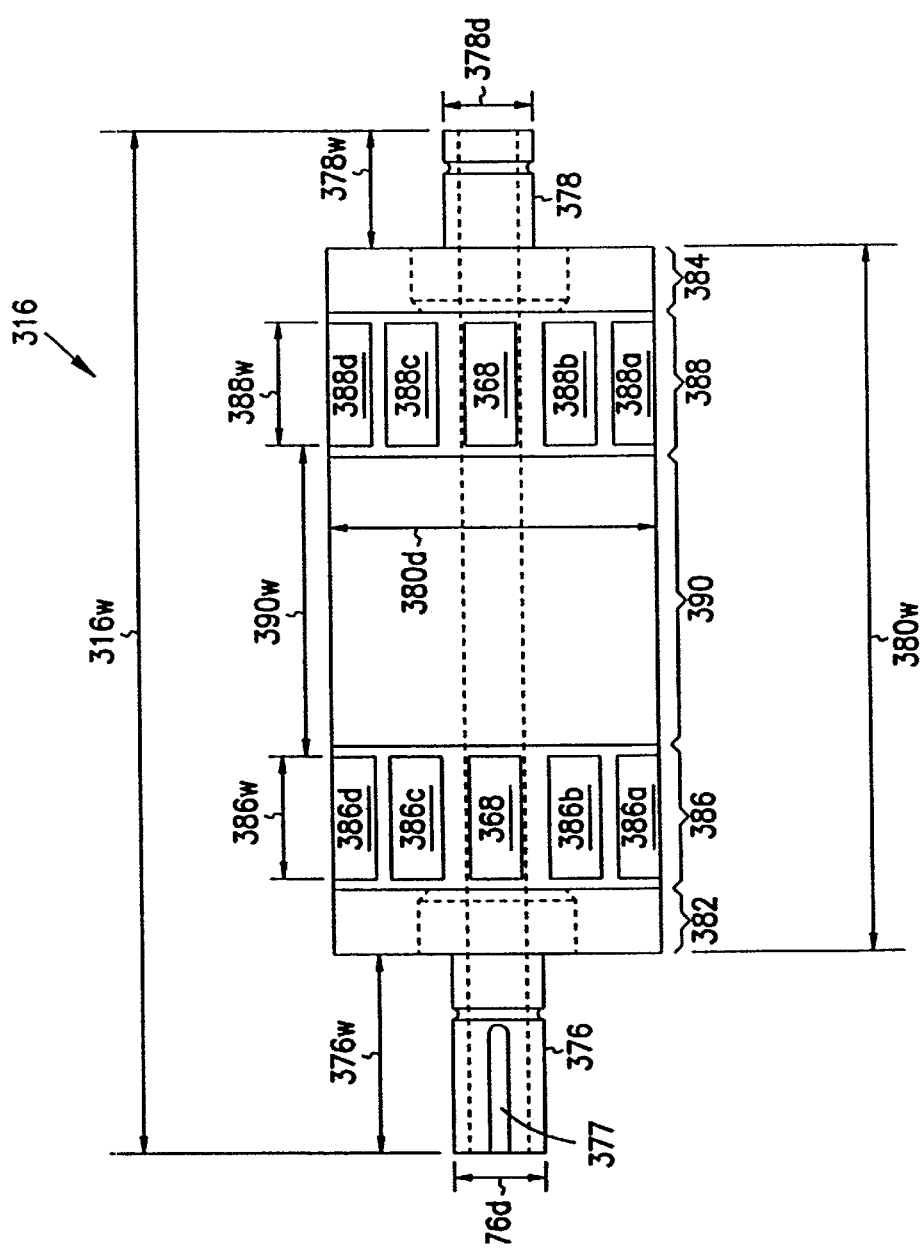
FIG. 3B is a top view of shimroller 316.

FIG. 3B is a front view of shimroller 316 without shim 318, showing several features of the exemplary embodiment not visible in FIG. 3 or 3A. In particular, shimroller 316 has a total width 316w of 21.75 inches (550 mm), including a left spindle portion 376 having a width 376w of 6.5 inches (165 mm) and a diameter 376d of 1.25 inches (32 mm) and a right spindle portion 378 having a width 378w of 2.5 inches (64 mm) and diameter 378d of 1.25 inches (32 mm). Left spindle portion 376 includes a 1.18-inch-by-0.056-inch-by-0.25-inch (30×1.5×6 mm) groove 377.

Between spindle portions 376 and 378 is a roller portion 380, which has a diameter 380d of about 3.8–3.9 inches (97–99 mm) and a width 380w of 12.75 inches (324 mm). Roller portion 380 includes left and right bearer regions 382 and 384, left and right magnetic regions 386 and 388, and a center region 390. Bearer regions 382 and 384, which are about 0.75 inches (19 mm) wide in this embodiment, contact respective end portions of force roller 320 as shown in FIG. 3. In this exemplary embodiment, magnetic region (or band) 386 include one or more permanent magnets—for example, 386a, 386b, 386c, and 386d—inset around its circumference. Magnetic region 386 also includes recess 368 which mates with block 366 as shown in the cross-sectional view of FIG. 3A. Magnetic region (or band) 388 includes one or more permanent magnets—for example, 388a, 388b, 388c, and 388d—inset around its circumference. In the exemplary embodiment, magnets 386 and 388 have respective widths 386w and 388w of about 2.0 inches (51 mm), heights 386h and 388w of about 0.75 inches (19 mm), and depths (not shown) of about 0.75 inches (19 mm). The magnets in the exemplary embodiment are at least strong enough to hold the trailing edge of shim 318 against shimroller 316 during its maximum rate of operation. The magnets need not be of the same strength or size, although ideally they have substantially the same mass and mass distributions to facilitate balanced rotation of the shimroller.

Figure 3E:
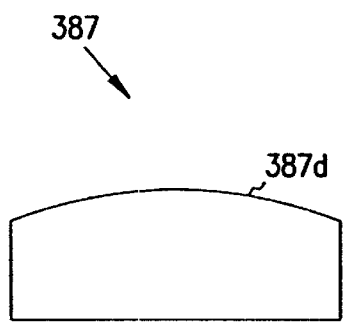
FIG. 3E is a side view of exemplary magnetic assembly 387.
Figure 3D:
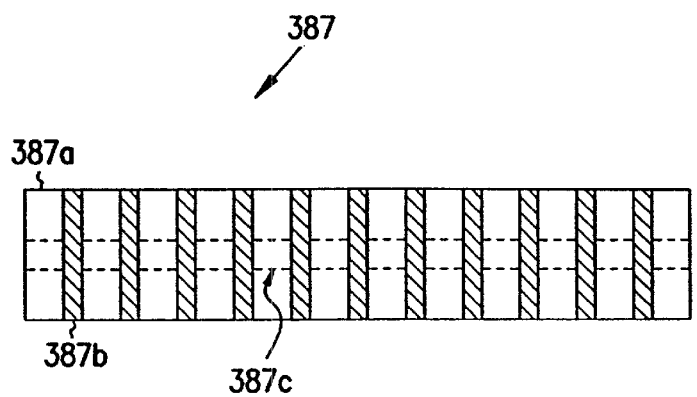
FIG. 3D is a top view of an exemplary magnetic assembly 387.

FIGS. 3D and 3E show a respective top and side view of a magnetic assembly 387 used for each of the 22 magnets 386 and 388 in the exemplary embodiment of FIG. 3B. Magnetic assembly 387 includes an interleaved arrangement of 12 permanent ceramic-magnet plates 387a and 12 ferromagnetic plates 387b, with a ferromagnetic plate between each adjacent pair of ceramic-magnet plates. This arrangement provides seven poles per inch. A ferromagnetic dowel, or rod, 387c extends through a hole in each magnetic and ferromagnetic plate. A high-temperature epoxy adhesive secures each interleaved assembly of magnetic and ferromagnetic plates in a recess corresponding to a position of one of magnets 386 and 388. FIG. 3E shows that each plate in the assembly has a top radial edge 387d sized to meet flush or substantially flush with the surface of the shimroller.

The invention, however, is not limited to any particular number, strength, arrangement, construction, dimensions, or attachment of magnets to shimroller 316. For example, one embodiment includes only one pair of magnets to hold the trailing edge of shim 316 or include a single magnetic member that extends across most or all of roller portion 380 or across most or all of center portion 390 to hold a trailing edge portion of the shim. Other embodiments form one or both of magnetic regions 386 and 388 as a continuous magnetic band encircling an eighth, a quarter, a half, or the whole of shimroller 316, for example. Moreover, still other embodiments use one or more electromagnetic members to define a particular magnetic region.

More generally, the inventors contemplate extension of their teachings to use an attractive force, such as magnetism, to hold a shim to using other attractive forces, such as electrostatic forces or negative pressures. A negative pressure or vacuum embodiment would likely entail providing one or more orifices at strategic points of the shimroller, for example, within regions 386 and 388, with each orifice communicatively coupled to a negatively pressurized axial bore in the shimroller, such as axial bore 392 in FIG. 3B. The axial bore would, in turn, be coupled to a pump to develop a negative pressure, that is, a pressure less than that of the ambient environment.

FIG. 3C is a side view of shimroller 316, showing location of magnets 386 and location of block 366 and recess 368 used with shimclamp 356 (of FIGS. 3 and 3A.) More particularly, FIG. 3C shows three equispaced fasteners 391–393 which secure portion 384 to portion 388 of shimroller 316. It also shows three equispaced jack-screws 394–396, which facilitate separation of portion 384 from portion 388 during disassembly of shimroller 316. Portions 382 and 386 are similarly secured and disassembled.

Figure 4A:
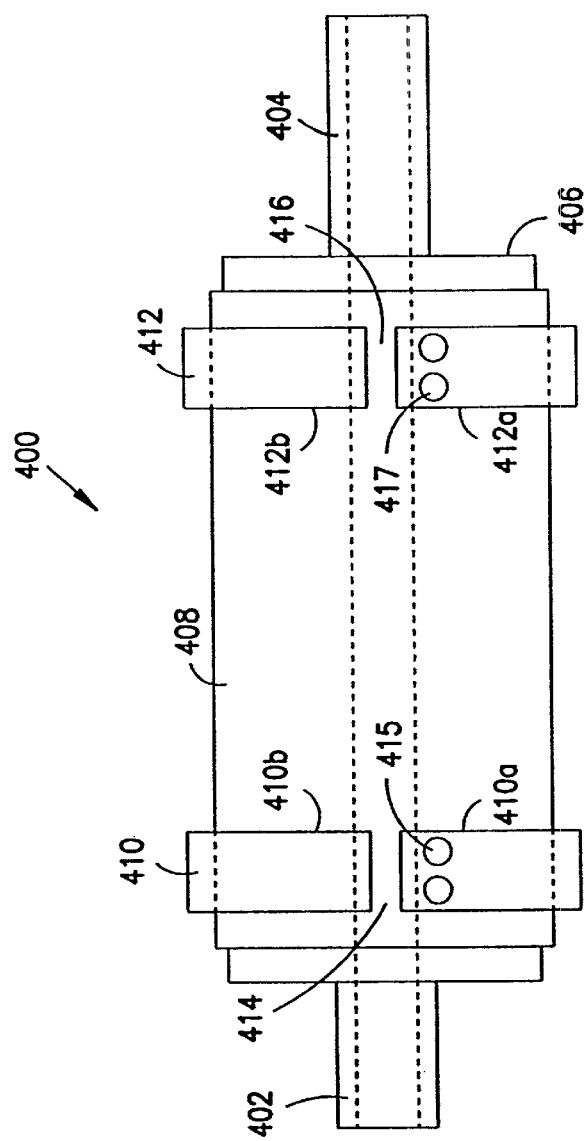
FIG. 4A is a top view of an alternative shimroller 400.
Figure 4B:
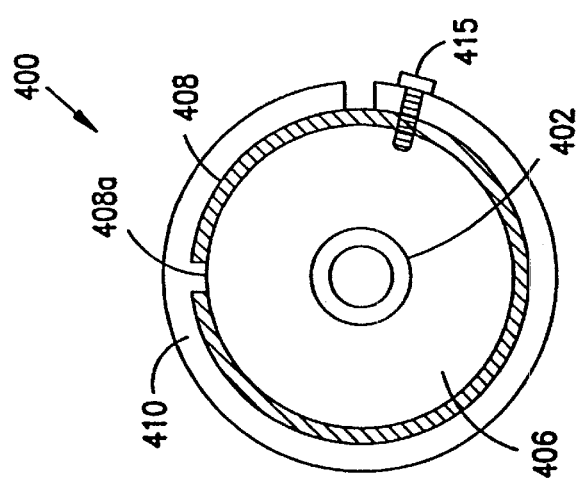
FIG. 4B is a side view of shimroller 400.

FIGS. 4A and 4B show respective top and side views of an alternative shimroller 400 which embodies principles that can be used independently or jointly with one or more other teachings embodied in shimroller 316. Specifically, shimroller 400 includes respective left and right spindle portions 402 and 404 and a roller portion 406. Roller portion 406 is almost entirely surrounded by a shim 408 which is more clearly shown in the side view of FIG. 4B. Holding shim 408 against roller portion 408 are respective left and right shimcollars (or shimrings) 410 and 412, which, include respective ends 410a and 410b and 412a and 412b. End 410a is fastened or secured to shimroller 400 via screws or pins 415. Similarly, end 412a is fastened to shimroller 400 via screws or pins 417.

FIG. 4B shows that shimcollars 410 and 412 span over a gap 408a between the leading and trailing edges 408b and 408c of shim 408. Additionally, FIG. 4B shows that screws or pins 415 (and 417) extend through shim 408 into the cylindrical surface of shimroller 400. One embodiment of shimroller 400 fastens ends 410a and 412a to shimroller 400 in a fashion analogous or similar to that illustrated using shimclamps 354 and/or 356 in FIG. 3A. Thus, one can laterally (or axially) adjust one or both shimcollars relative the shimroller to ensure a good fit between a shim and the surface of the shimroller.

In this exemplary embodiment, ends 410a and 410b and ends 412a and 412b are separated by respective gaps respective gaps 414 and 416. However, in other embodiments, one or more of shimcollars 410 and 412 forms a closed loop when installed on shimroller 400 with shim 408 in place. Though not shown here, other embodiments include screws that adjust the spacing between ends 410a and 410b and between ends 412a and 412b, and/or secure end 410a to end 410b and end 412a to end 412b. Shimcollars 410 and 412, which are formed of steel in the exemplary embodiment, have an interior diameter that matches that of roller portion 406 plus the nominal thickness of shim 408.

In other embodiments, the length of one or more of the shimcollars is substantially less than that necessary to fully encircle the roller portion of shimroller 400. For example, the shimcollars can be three-fourths, one-half, one-forth, one-eighth, or one-sixteenth of the circumstance, with one end attached to the shimroller to fasten a portion of the leading edge of shim 408 to the shimroller and the other end overlapping the trailing edge of the shim to prevent it from being centrifugally separated from the shimroller during embossing.

FIGS. 4C and 4D show respective top and side view of an such an alternative shimroller 400'. In particular, FIG. 4C shows short shimcollars 410' and 412', which, as measured from respective ends 410a' and 412a' to ends 410b' and 412b', are about one-third or one-fourth the circumference of the shim-mount surface of shimroller 400'. Each of the shimcollars spans a gap 408a between the leading and trailing edges of shim 408. To improve rotational balance in some embodiments, the inventors contemplate counterbalancing the mass of some shimcollars by internally weighting shimroller 400'.

Figure 5:
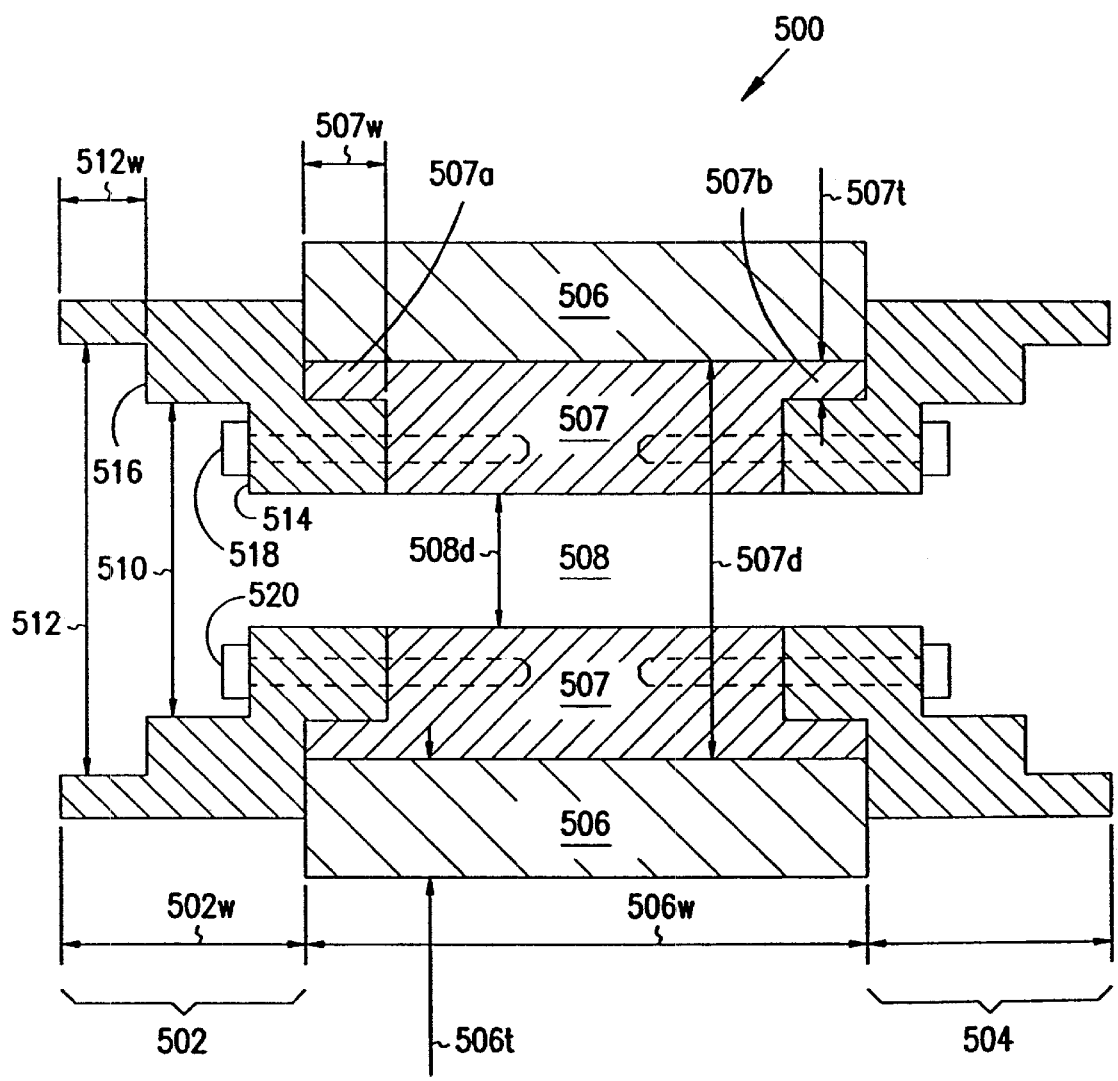
FIG. 5 is a cross-sectional view of a base roller 500.
Figure 6A:
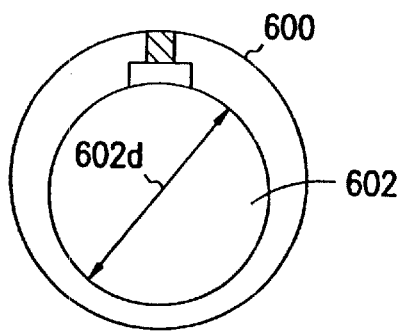
FIG. 6A is a front view of a cam 600 for raising or lowering a base roller relative a shimroller.
Figure 6B:
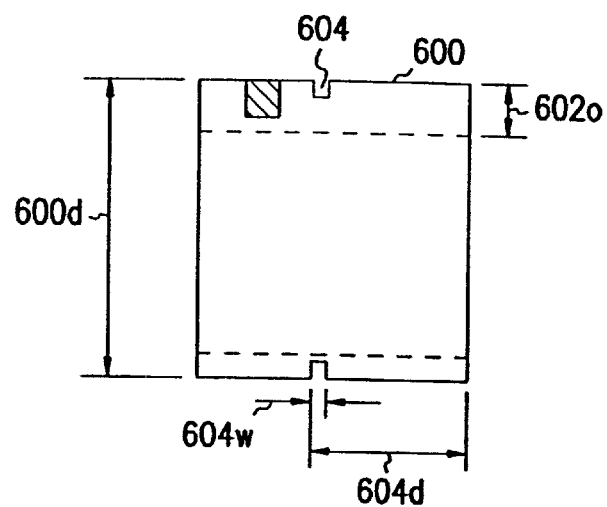
FIG. 6B is a side view of cam 600.
Figure 7A:
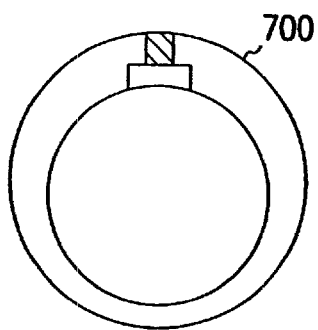
FIG. 7A is a front view of another cam 700 for raising and lowering a base roller relative a shimroller.
Figure 7B:
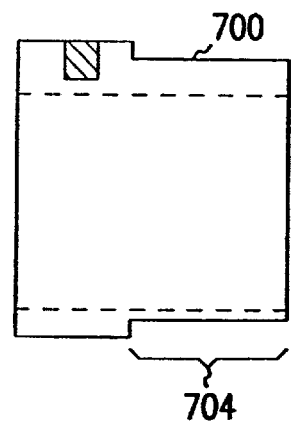
FIG. 7B is a side view of cam 700.

FIG. 5 is a cross-sectional view of a base roller 500 which may be used as base roller 214 in FIG. 2 or base roller 314 in FIG. 3. Base roller 500 includes left and right symmetrical bearing portions 502 and 504, an central roller portion 506, an axial bore 508. Axial bore 508 has a diameter 508d of 1.25 inches (32 mm), for example. Left and right symmetrical bearing portions 502 and 504, which are made of steel in the exemplary embodiment, have respective widths 502w and 504w of approximately 2.125 inches (54 mm) and include stepped axial bores 510 and 512. Bearing portion 502 is mounted to inner portion 507 via four fasteners, two of which are shown as fasteners 518 and 520. Axial bore 510, which provides clearance for the four fasteners, has a diameter of about 2.0 inches (51 mm) and extends 1.0 inches (54 mm) into the interior of base roller 500, forming an inner annular shoulder 514. Axial bore 512 defines an outer annular shoulder 516 and receives a bearing (not shown). The exemplary embodiment uses a bearing which complies with the NTN6207 bearing standard.

Central roller portion 506 has a diameter of about 4 inches (102 mm) and forms a sleeve around inner portion 507, which has a diameter 507d of about 2.5 inches (64 mm). Portion 507 has outer annular ring portions 507a and 507b with a thickness 507t of 0.1875 inches (5 min) and a width 507w of 0.5 inches (13 mm), for example. Central roller portion 506 has a width 506w of about 6.25 inches (159 mm) and a thickness 506t of about 1.0 inch (25 mm). In the exemplary embodiment, roller portion 506 comprises a polyimide, such as Torlon™ 4501 from Amoco Corporation or Vespell™ from Dupont, or a polyethcreter ketone, such as Peek™ from VicTrex Incorporated. The Torlon™ and Peek™ materials provide performance advantages over the Vespell™ polyimide as well as the steel, both of which are used conventionally. In particular, the Torlon™ polyimide unexpectedly enhances shimlife and thus reduces manufacturing cost. Peek™ polyethcreter ketone is expected to provide similar advantages.

In further contrast to conventional base rollers which have an initial diameter of about 8 inches (204 mm), exemplary base roller 500 has a diameter of about 4 inches (102 mm). The use of a smaller diameter dramatically reduces the weight of the base roller and facilitates maintenance activities, such as re-turning or re-shaping the base roller to ensure a good work surface. The conventional 8-inch (204 mm) base rollers are not only difficult to install and remove because of their weight but also require more frequent removal and installation because of their use of the Vespell™ polyimide. Therefore, the exemplary embodiment's use of a single base roller that is smaller, lighter, and more durable provides significant improvement.

FIGS. 6A and 6B, 7A and 7B show front and side view of respective exemplary cams 600 and 700 which can be used with base roller 500, specifically to raise and lower it about 0.125 inches (3 mm) during operation of mnicroembosser 200 or 300. A pair of cams 600 (or a pair of cams 700) fit inside the bearings of base roller 500 and engage with a rotary actuator (not shown.) Cam 600, which includes an interior bore 602 and a retaining-ring groove 604, has an exemplary exterior diameter 600d of about 1.378 inches (35 mm). Interior bore 602, which is offset by an exemplary distance 602o of about 0.125 inches (3 mm) or 0.25 inches (6 mm) from the center of the cam, has an exemplary interior bore diameter 600i of about 1.0 inches (25 mm). Retaining-ring groove 604 has a width of 604w of about 0.0625 inches (2 mm) and is positioned a distance 604d, for example 0.675 inches (17 mm), from one face of the cam. Cam 700, which has exemplary dimension (not labeled) similar to cam 600, replaces retaining-ring groove 604 with a smaller-diameter region 704.

At startup of in-line apparatus 200 in FIG. 2, the rotary actuator, for example a pneumatic rotary actuator, rotates the cams, thereby raising the base roller and bringing a web, such as web 210, into contact with a shim, such as shim 218. Conversely, when the apparatus or microembosser stops or receives a stop command, the actuator automatically rotates the cams to lower the base roller and separate the web from the shim, which is typically heated through the shimroller. Automatic separation prevents the stopped or decelerating web from melting or severing because of continued contact with the heat shim. In contrast conventional microembosser include a manually engaged lever mechanism to move the base roller toward or away from the shimroller. This arrangement requires human operators to remember to engage the lever and is therefore prone to human error.

In some embodiments, a timer delays operation of the rotary actuator for a specific time after start up of the in-line apparatus or the microembosser to allow all portions of the apparatus to reach their intended operating speeds. One or more of the web processing devices, such as printer 206 or diecutter 208, may have masses that require appreciable time to accelerate to an intended operating speed. Other embodiments use the timer to also delay engagement of the shimroller and base roller until the shimroller reaches a desired operating temperature, thereby reducing web waste.

Furthermore, other embodiments of the invention use a similar cam-arrangement or other axialifting mechanism to raise or lower the shimroller relative the base roller, or to move both the shimroller and base roller toward each other. Thus, this aspect of the invention encompasses not just raising or lowering either the base roller or the shimroller but more generally automatically moving either the base roller or the shimroller relative the other.

CONCLUSION

In furtherance of the art, the inventors have devised an in-line apparatus which includes a microembosser in combination with one or more other web-processing devices, such as laminater, printer, or diecutter. The exemplary embodiment of the in-line apparatus includes an exemplary microembosser which one or more unique features. Among these are a shimroller with one or more leading-edge shimclamps, one or more magnetic shimholding members, and one or more internal temperature sensors. Additionally, the exemplary microembosser mechanism for automatically separating the base roller from the shimroller when the microembosser stops.

The embodiments described above are intended only to illustrate and teach one or more ways of practicing or implementing the present invention, not to restrict its breadth or scope. The actual scope of the invention, which embraces all ways of practicing or implementing the invention, is defined by the following claims.

What is claimed is:

1. A rotary microembossor comprising:
   a base roller having a rotational axis;
   a shimroller including a rotational axis substantially parallel to the rotational axis of the base roller and a cylindrical surface for mounting an embossing shim;
   a temperature sensor at least partially inside the shimroller for facilitating temperature control of the shimroller;
   one or more shimcollars or shimclamps fastened to the shimroller, each having a portion attached to the cylindrical space and a portion for overlying leading and trailing edges of an embossing shim mounted to the cylindrical surface; and
   means responsive to an operating status of the microembosser for automatically changing relative position of the rotational axis of the base roller and the rotational axis of the shimroller.

2. The rotary microembosser of claim 1, wherein the shimroller further comprises means for attracting the embossing shim to the cylindrical surface.

3. The rotary microembosser of claim 2 wherein the means for attracting a shim comprises one or more magnetic regions, with each of the magnetic regions comprising: an interleaved assembly of at least first and second individual permanent magnets and at least first and second ferromagnetic plates; and a ferromagnetic rod extending through each of the first and second magnets and the first and second plates.

4. The rotary microembosser of claim 3, wherein the shimroller includes first and second ends and a first subset of the magnetic regions are spaced around the first end and second subset of the magnetic regions are spaced around the second end, with the region between the first and second ends having no magnetic regions.

5. The rotary microembosser of claim 1, wherein at least one of the shimcollars or shimclamps comprises
   first clamping means for attaching a first portion of the shim to the cylindrical surface; and
   second clamping means for attaching a second portion of the shim to the cylindrical surface, the second means being adjustable axially relative the first clamping means.

6. A rotary microembosser for receiving a shim and embossing diffraction patterns on a continuous web, the microembosser comprising:
   at least one base roller having a rotational axis;
   a shimroller having a rotational axis substantially parallel to the rotational axis of the base roller and a cylindrical surface for mounting a shim, the surface having a recess;
   first clamping means for attaching a first portion of the shim the cylindrical surface, wherein the first clamping means comprises a first block bolted or screwed to the cylindrical surface; and
   second clamping means for attaching a second portion of the shim to the cylindrical surface, the second means being adjustable axially relative the first clamping means, wherein the second clamping means comprises a recess in the cylindrical surface, a axial adjustment block located in the recess, and a second block bolted or screwed to the axial adjustment block.

7. A rotary microembosser for receiving a microembossing shim having leading and trailing edges and embossing diffraction patterns on a continuous web, the microembosser comprising:
   a shimroller having a rotational axis and a cylindrical surface for supporting the microembossing shim;
   means, overlying the leading and trailing edges, for holding the microembossing shim adjacent the cylindrical surface; and
   a temperature sensor located at least partially inside the shimroller.

8. The rotary microembosser of claim 7, wherein the temperature sensor is a thermocouple.

9. The rotary microembosser of claim 7, wherein the temperature sensor is located on or near the rotational axis of the shimroller.

10. A rotary microembosser comprising:
    a base roller having a rotational axis;
    a shimroller having a rotational axis substantially parallel to the base roller, a cylindrical surface which defines an interior and has a circumference, and a temperature sensor within the interior;
    a pair of shimcollars for holding a microembossing shim adjacent the cylindrical surface, each shimcollar having an arcuate portion overlying leading and trailing edges of the microembossing shim; and
    means responsive to an operating status of the microembosser for automatically changing relative position of the rotational axis of the base roller and the rotational axis of the shimroller.

11. The rotary microembosser of claim 10, wherein the means is responsive to issuance of a stop command or stopping of the microembosser to move the base roller away from the shimroller.

12. The rotary microembosser of claim 10, wherein the shimroller further comprises a heating element within the interior and wherein the means is responsive to issuance of a stop command or stopping of the microembosser to separate the base roller and the shimroller and thereby prevent excess heating of a web positioned between the base roller and the shimroller.

13. A rotary microembosser for receiving a shim and embossing diffraction patterns on a continuous web, the microembosser comprising:
    at least one base roller having a rotational axis; and
    at least one shimroller having a rotational axis substantially parallel to the rotational axis of the base roller and a surface for mounting a shim;
    one or more shimcollars for holding at least a portion of a shim against or near the surface of the shimroller, each shimcollar having a portion which fastens or secures to the surface and a portion which spans a gap between two substantially parallel edges of the shim.

14. A shimroller comprising:
    a cylindrical surface for mounting a stamping shim; and
    one or more shimcollars or shimclamps fastened to the shimroller, each having a portion attachable to the cylindrical surface and a portion for spanning a gap between leading and trailing edges of a stamping shim mounted to the cylindrical surface.

15. A shimroller comprising:
    a cylindrical surface for mounting a stamping shim, the cylindrical surface defining an interior of the shimroller;
    a temperature sensor at least partially within the interior of the shimroller;
    one or more shimcollars or shimclamps fastened to the shimroller, each having a portion attachable to the cylindrical surface and a portion for spanning a gap between leading and trailing edges of a stamping shim mounted to the cylindrical surface.

16. A method of producing an article of manufacture having at least one microembossed portion, the method comprising:
    installing a microembossing shim having a reflective or diffractive pattern and a leading and a trailing edge onto a cylindrical surface of a shimroller, using at least two shim-holding devices each having a portion attached to the cylindrical surface and a portion overlying the leading and trailing edges of the microembossing shim.

17. A method of using an embosser having a first shimroller, the method comprising:
    removing the first shimroller; and
    installing a second shimroller in place of the first shimroller, the second shimroller comprising:
    a cylindrical surface for mounting a stamping shim; and
    one or more shimcollars or shimclamps fastened to the shimroller, each having a portion attachable to the cylindrical surface and a portion for spanning a gap between leading and trailing edges of a stamping shim mounted to the cylindrical surface.

18. The method of claim 17, wherein the first shimroller includes two shimclamps each having a length more than one half a width of the first shimroller and positioned substantially parallel to a rotational axis of the first shimroller when fastened to the first shimroller.

19. The method of claim 17, wherein the stamping shim comprises a diffractive or reflective patterns.

20. The method of claim 17, wherein the leading and trailing edges confront each other to define the gap.

21. A rotary microembosser comprising:
    a base roller having a rotational axis;
    a shimroller including a rotational axis substantially parallel to the rotational axis of the base roller and a cylindrical surface for mounting an embossing shim;
    a temperature sensor at least partially inside the shimroller for facilitating temperature control of the shimroller;
    one or more shimcollars or shimclamps fastened to the shimroller, each having a portion attached to the cylindrical surface and a portion for spanning a gap between leading and trailing edges of an embossing shim mounted to the cylindrical surface; and
    means responsive to an operating status of the microembosser for automatically changing relative position of the rotational axis of the base roller and the rotational axis of the shimroller,
    wherein the cylindrical surface has a circumference, and wherein at least one of the shimcollars or shimclamps defines an arc having a length at least three fourths of the circumference of the cylindrical surface, with at least one end of the arc fastened to the cylindrical surface.

22. A rotary microembosser comprising:
    a base roller having a rotational axis;
    a shimroller including a rotational axis substantially parallel to the rotational axis of the base roller and a cylindrical surface for mounting an embossing shim;
    a temperature sensor at least partially inside the shimroller for facilitating temperature control of the shimroller;

one or more shimcollars or shimclamps fastened to the shimroller, each having a portion attached to the cylindrical surface and a portion for spanning a gap between leading and trailing edges of an embossing shim mounted to the cylindrical surface; and means responsive to an operating status of the microembosser for automatically changing relative position of the rotational axis of the base roller and the rotational axis of the shimmoller, wherein the cylindrical surface has a circumference, and wherein at least one of the shimcollars or shimclamps defines an arc having a length less than one fourth of the circumference of the cylindrical surface, with at least one end of the arc fastened to the cylindrical surface.

23. A rotary microembosser for receiving a shim and embossing diffraction patterns an a continuous web, the microembosser comprising:

at least one base roller having a rotational axis; and a shimroller having a rotational axis substantially parallel to the rotational axis of the base roller and a cylindrical surface for confronting a major surface of an embossing shim having leading and trailing edges and a diffraction pattern, with the cylindrical surface including at least one axially oriented recess;

a structure mounted in the one axially oriented recess;

first and second shimcollars for overlying respective first and second portions of the leading and trailing edges, with the first and second shimcollars defining respective arcs and at least one of the first and second shimcollars having an end portion fastened to the structure mounted in the axially oriented recess.

24. The rotary microembosser of claim 23, wherein the cylindrical surface has a circumference, and wherein the arc of at least one of the shimcollars has a length less than one fourth of the circumference of the cylindrical surface.

25. The rotary microembosser of claim 23, wherein the cylindrical surface has a circumference, and wherein the arc of at least one of the shimcollars has a length more than three fourths of the circumference of the cylindrical surface.

26. The rotary microembosser of claim 23, wherein the shimroller further comprises a temperature sensor at least partially inside the shimroller.

27. The rotary microembosser of claim 23, further comprising means responsive to an operating status of the microembosser for automatically changing relative position of the rotational axis of the base roller and the rotational axis of the shimroller.

28. The rotary microembosser of claim 23, wherein the leading and trailing edges confront each other to define a gap.

29. The rotary microembosser of claim 23:

wherein the base roller has a diameter that is no more than about 102 millimeters; and wherein the base roller comprises a layer of Torlon™ 4501 polymide or a polyetheretor ketone.

* * * * *